No. 840,462. PATENTED JAN. 8, 1907.
R. F. BARKER & C. G. McCUMBER.
CHEMICAL FIRE EXTINGUISHER.
APPLICATION FILED AUG. 1, 1906.
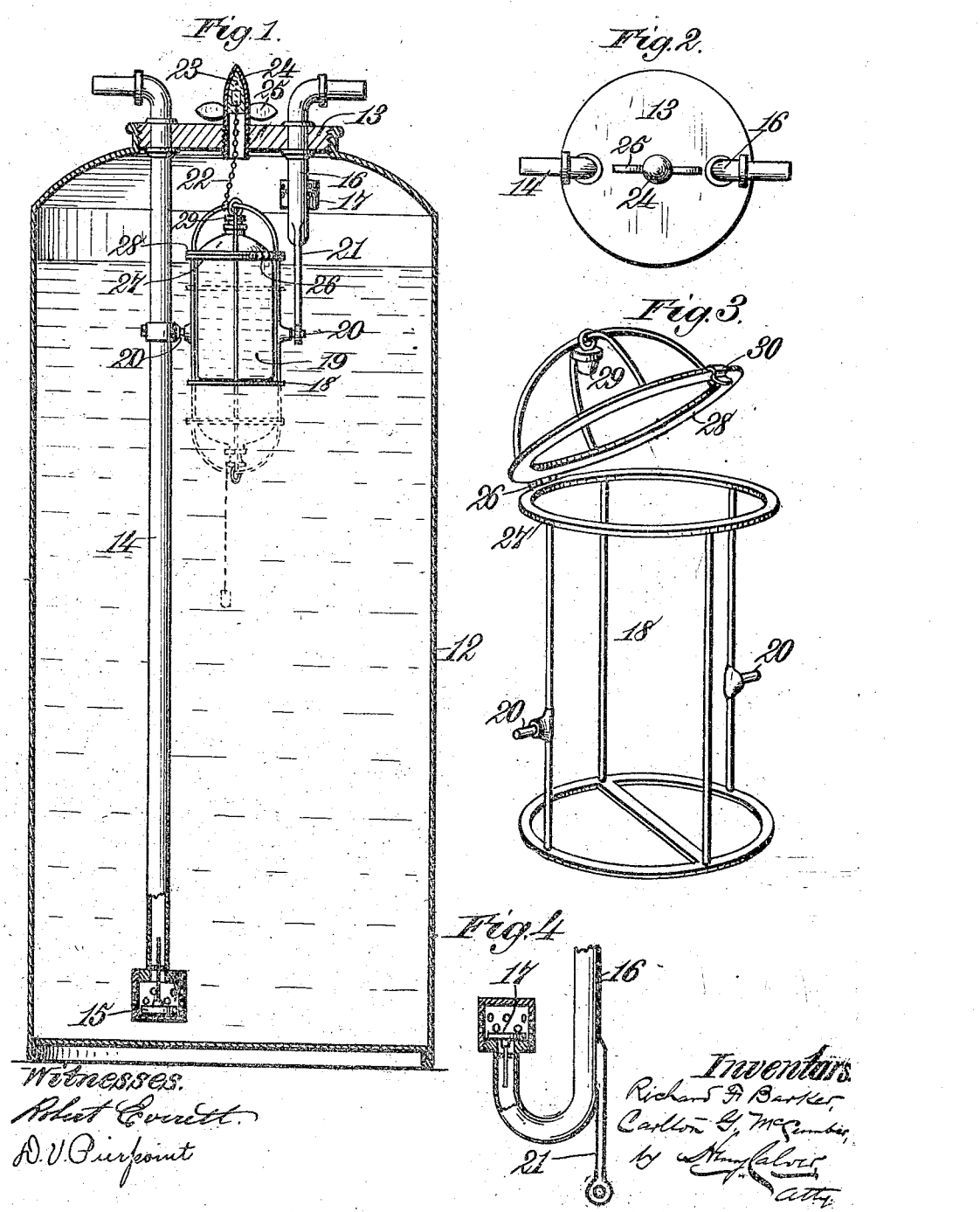

UNITED STATES PATENT OFFICE.

RICHARD F. BARKER AND CARLTON G. McCUMBER, OF ADAMS, NEW YORK.

CHEMICAL FIRE-EXTINGUISHER.

No. 840,462.   Specification of Letters Patent.   Patented Jan. 8, 1907.

Application filed August 1, 1906. Serial No. 328,711.

*To all whom it may concern:*

Be it known that we, RICHARD F. BARKER and CARLTON G. McCUMBER, citizens of the United States, residing at Adams, in the county of Jefferson and State of New York, have invented or discovered certain new and useful Improvements in Chemical Fire-Extinguishers, of which the following is a specification, reference being had therein to the accompanying drawings.

This invention relates to that class of chemical fire-extinguishers in which the force required for expelling an extinguishing solution from the vessel containing the same is developed by mixing an acid with an alkaline solution within the vessel; and the invention has for its object to provide an extinguisher of this class which may be automatic in its action and which is also adapted to be reversed manually for the purpose of developing the expelling gas within the vessel, so as to be usable as a hand-extinguisher.

In the accompanying drawings, Figure 1 is a vertical section, with parts in elevation, of an apparatus embodying the invention. Fig. 2 is a detail plan view of the cap of the extinguisher with the parts mounted thereon. Fig. 3 is a detail view of the cage for holding the acid-bottle. Fig. 4 is a detail view showing the upper valve which will open by gravity when the extinguisher is reversed manually.

Referring to the drawings, 12 denotes the body or vessel of the extinguisher, which may be of any suitable form or size and which will preferably be of sheet metal. Into the top of this vessel is screwed or otherwise removably secured a cap 13, in which is fixed an eduction pipe or tube 14, provided at its lower end with a gravity-valve 15, which will be normally open, but which will close by gravity when the vessel is reversed, the upper outer end of the said tube being adapted for attachment thereto of any suitable spray device or nozzle. Also fixed to the cap 13 is a shorter eduction pipe or tube 16, to the upper end of which may be attached a suitable hose or spraying device, the portion of said tube within the vessel being bent in U shape with the upper end of its shorter limb provided with a gravity-valve 17, which will be normally closed, but which will open by gravity when the vessel is reversed or turned upside down.

Suitably suspended from the cap 13 is a cage 18, adapted to contain the acid-holding bottle 19, said cage being provided with suitable pivots or trunnions 20, by means of which it may be pivotally supported on the pipe or tube 14 and on the rod or bar 21, depending from the pipe or tube 16, so that said cage is adapted to be reversed, as indicated by dotted lines in Fig. 1. The cage 18 is pivotally suspended in such a manner, preferably slightly off its center, that it will have a tendency to turn over to the position shown by dotted lines in Fig. 1, excepting when restrained from doing so, and the said cage is normally retained in the position shown in full lines in Fig. 1 by a suitable retaining device, preferably consisting of a chain 22, detachably connected at its lower end with the said cage, as by being hooked to the top of the cage in any suitable manner. The upper end of said chain is embedded in a suitable plug or body 23, consisting of a composition having a low fusing-point and inserted in a holder or casing 24, screwed into the cap 13 and preferably provided with wings 25, by which it may be readily turned in screwing or unscrewing. The top of this holder or casing is preferably of a suitable heat-conducting metal, so that if a fire accidentally occurs the heat thereof will melt the fusible plug or material 23 within the upper end of said holder or casing, thereby releasing the chain 22 and permitting the cage to turn over, so as to mix the acid held in the bottle 19 with the alkaline solution in the vessel 12 to develop the gas necessary to expel the extinguishing fluid from the vessel through the tube or pipe 14. If, however, it be desired to develop expelling-gas within the vessel by reversing said vessel manually in the usual manner, such reversal of the vessel will of course permit the acid in the bottle 19 to mix with the alkaline solution in the vessel, and when the vessel is thus reversed the valve 15 will close by gravity and the valve 17 will open by gravity in such a manner as to permit the extinguishing fluid to flow outward through the tube 16, whence it can be directed, as may be desired, through a suitable hose attached to outer end of said tube.

To provide for the ready insertion or removal of the acid-bottle 19 into or from the cage 18, the top of the latter is preferably hinged or pivoted at 26 to a ring 27, the said hinged top portion comprising a ring 28, which is preferably slightly less in diameter than the ring 27, so as to fit against the top shoulder of the acid-bottle 19. The hinged top is held closed by a suitable spring-catch, as 30. The stopper 29 for the acid-bottle, which is intended to fit loosely in the neck or mouth of the latter, is preferably attached to the top of the cage, and owing to the loose fit of the said stopper in the neck or mouth of the bottle said stopper will partly fall out of said neck or mouth when the bottle is reversed, so as to permit the acid to run out slowly, and thus suitably mix with the alkaline solution in the vessel.

From the foregoing it will be understood that the invention comprises a chemical fire-extinguisher which may be automatic in its action by reason of the melting of the fusible plug, but which is also adapted to be used manually or as a hand-extinguisher by reversing, as is common in the operation of extinguishers of this kind.

Having thus described our invention, we claim and desire to secure by Letters Patent—

1. A chemical fire-extinguisher comprising the combination with a suitable vessel, of means for reversibly supporting an acid-bottle within the same, and two eduction pipes or tubes extending within the vessel and provided with reversely-acting gravity-valves, so that the extinguisher is adapted for either automatic or manual operation.

2. A chemical fire-extinguisher comprising the combination with a suitable vessel, the means for reversibly supporting an acid-bottle within the same, a fusible plug connected with the acid-bottle support in such a manner as normally to retain it in an upright position, and which acid-bottle support is adapted to turn over or reverse itself when the said fusible plug is melted, two eduction tubes or pipes extending within the said vessel and provided with reversely-acting gravity-valves, so that the extinguisher is adapted for either automatic or manual operation.

3. A chemical fire-extinguisher comprising the combination with the vessel 12, of the cap 13 removably secured in the mouth thereof, two eduction tubes or pipes mounted in said cap and provided with reversely-acting gravity-valves, a pivoted and reversible bottle-support suspended from said cap within said vessel, and a fusible plug mounted on said cap and with which said bottle-support is connected.

4. A chemical fire-extinguisher provided interiorly with a bottle-supporting cage having a hinged top, combined with an acid-bottle within said cage and a stopper for said acid-bottle attached to said hinged top so as to loosely fit in the neck or mouth of said bottle.

5. A chemical fire-extinguisher provided interiorly with a bottle-supporting cage having a hinged top, combined with a cap from which said cage is suspended and with which cap said cage has a fusible connection, an acid-bottle within said cage, and a stopper for said acid-bottle attached to said hinged top so as to loosely fit in the neck or mouth of said bottle.

In testimony whereof we affix our signatures in presence of two witnesses.

RICHARD F. BARKER.
CARLTON G. McCUMBER.

Witnesses:
A. A. DUNHAM,
C. G. ALBIN.